US006848253B2

(12) United States Patent
Johansson et al.

(10) Patent No.: US 6,848,253 B2
(45) Date of Patent: Feb. 1, 2005

(54) CONTROL METHOD AT TRUCK

(75) Inventors: Jimmy Johansson, Sturefors (SE); Joakim Bärnström, Linkoping (SE)

(73) Assignee: BT Industries (SE)

(*) Notice: Subject to any disclaimer, the term of this patent is extended or adjusted under 35 U.S.C. 154(b) by 0 days.

(21) Appl. No.: 10/453,023

(22) Filed: Jun. 3, 2003

(65) Prior Publication Data

US 2004/0003589 A1 Jan. 8, 2004

(30) Foreign Application Priority Data

Jun. 5, 2002 (SE) .......................................... 0201710

(51) Int. Cl.[7] .......................................... F16D 31/02

(52) U.S. Cl. .......................................... 60/414; 60/413

(58) Field of Search .................................. 60/414, 413

(56) References Cited

U.S. PATENT DOCUMENTS 3,779,017 A * 12/1973 Fujisawa et al. .............. 60/413
5,579,868 A * 12/1996 Pelto-Huikko ............... 60/414
6,005,360 A * 12/1999 Pace ........................... 60/414
6,460,332 B1 * 10/2002 Maruta et al. ................ 60/414
6,502,393 B1 * 1/2003 Stephenson et al. .......... 60/414

* cited by examiner

*Primary Examiner*—Edward K. Look
*Assistant Examiner*—Michael Leslie
(74) *Attorney, Agent, or Firm*—Hayes Soloway P.C.

(57) ABSTRACT

Method to control the lowering movement of the lifting cylinder or cylinders (1, 2) of a truck. When a lowering is to take place the pump (5) is started in the pumping direction for increasing the pressure between the pump and a load-holding valve (3, 4) until essentially the pressure has been achieved as in the hydraulic cylinder (1, 2), whereafter the pump with its motor is switched over to regenerative operation, that is the pump works as motor and the motor as generator. The holding valve (3, 4) is opened so that the oil while driving the pump can flow back through this.

4 Claims, 2 Drawing Sheets

Figure 1:
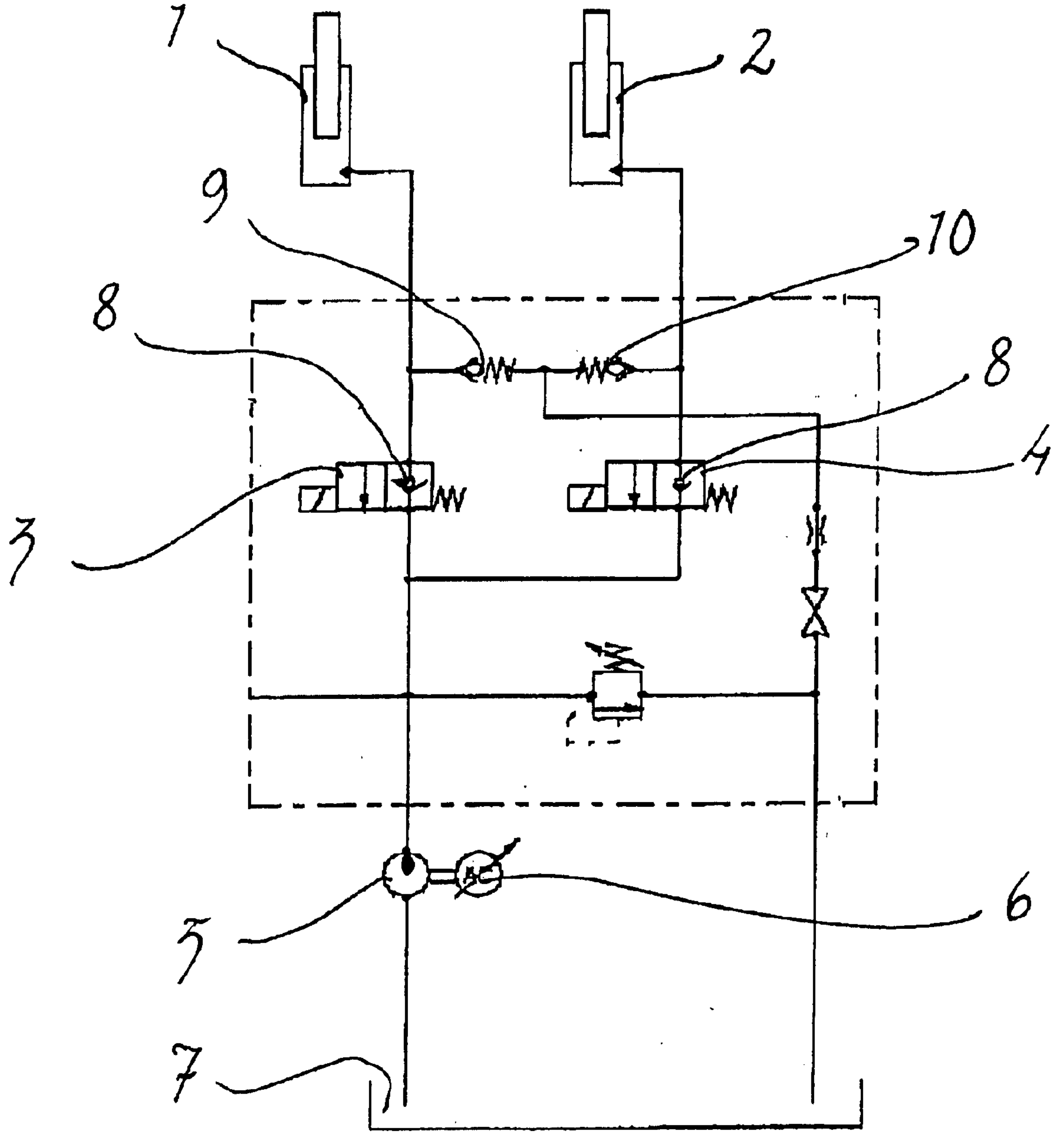

Fig. 2
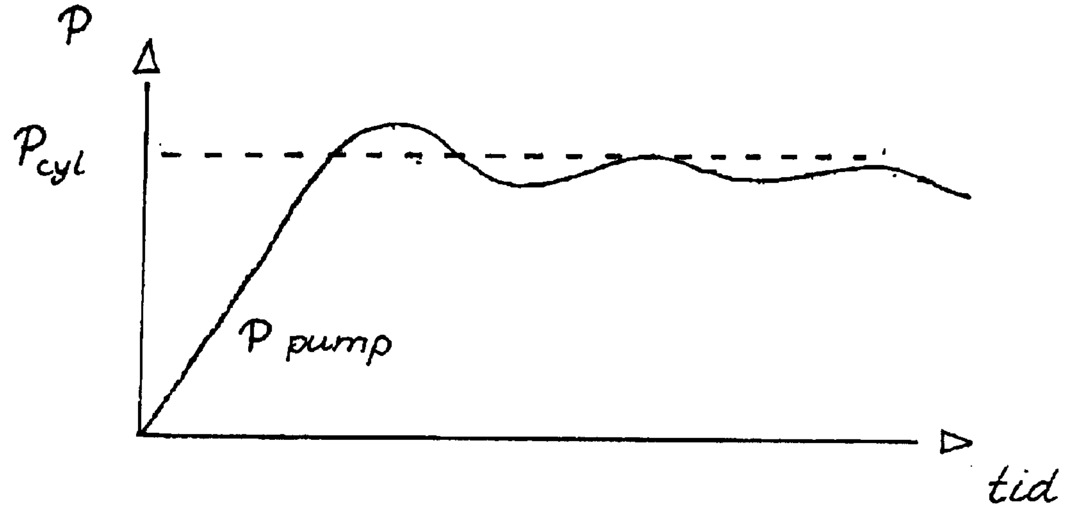
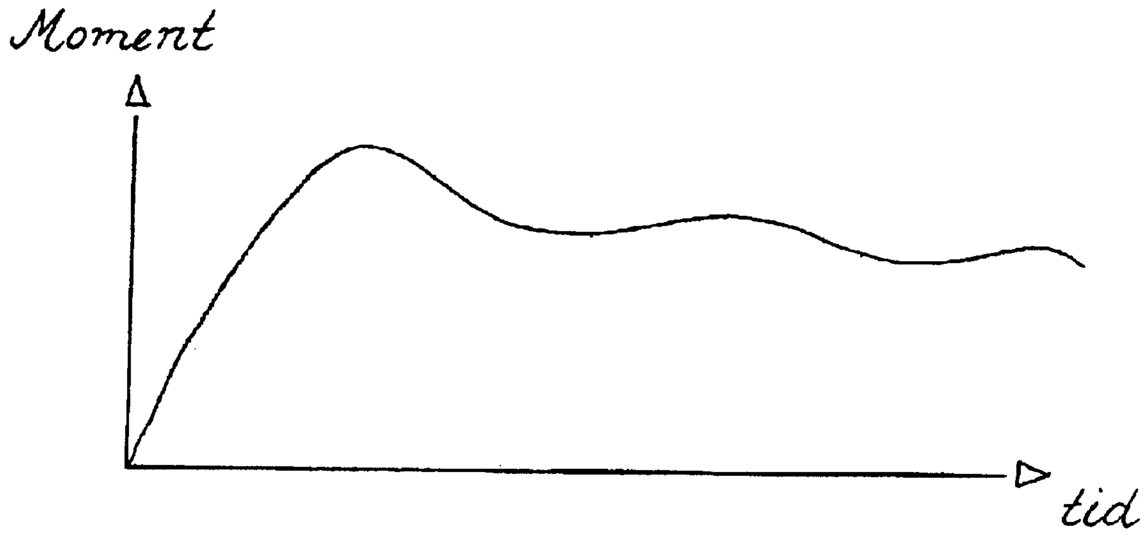
Fig. 3

CONTROL METHOD AT TRUCK

At battery powered trucks usually the speed of the lifting movement is controlled by means of the number of revolutions of the pump, while the speed of the movement at lowering is controlled by means of a constricting valve through which the oil is allowed to flow back to a reservoir from the lifting piston. At this the potential energy of the lifting system is converted into heat in the oil and is wasted. In order to reuse the lifting energy it is known to control the lowering movement by means of pump and motor, at which the pump drives the motor that then function as a generator and recharges the battery. This return of the energy give a longer time of use at the same charge or a possibility to use smaller batteries at retained time of use between the charging times. In particular this solution is suitable for trucks with a large weight of its own in the parts that are lifted, as for example driver lifting trucks where in addition to frame, and fork apparatus also driver cage and driver are lifted.

One problem at the retrieving of the energy by controlling the lowering by means of the pump is that there is allays a small jolt when the lowering is initiated. The reason for this is that between the valve that locks the elevated position and the pump that is without pressure a compression of the intermediate oil volume take place when the valve opens. In particular trucks where the cage and the driver take part in the lifting movement this can be experienced as very unpleasant and can also give rise to unpleasant oscillations in the system.

In order to eliminate this unpleasant and disturbing jolt one can consider to start the pump before lowering with a pumping movement, as if lifting was to take place, and after a fixed comparatively short time the valve is opened and the feed current to the pump motor interrupted. The pump will now function as an hydraulic motor driven by the return flow of oil, and the pump now drives the pump motor that now functions as a generator and the current thus generated is fed back to the battery charging this. A drawback at this solution is however that a delay time is obtained between the activating of the operator of the lowering and the actual starting of this. This is disturbing for the operator that will have the feeling that the truck does not respond to the lowering movement, and then when the lowering starts also this may be experienced as uncomfortable and surprising. In order to take into consideration the variations in viscosity of the oil dependent of the temperature etc and the degree of wear of the motor the time used to increase the pressure must be excessive. This solution is thus not entirely satisfactory either.

In view of the above it is the object of the invention to provide a method and a device that eliminates an initial jolt and reduce or eliminates the delay.

In accordance with the invention this object is solved by the immediate starting of the pump in the pumping direction, at the starting order for lowering, increasing the pressure between pump and valve, the pump is then stopped in the same moment that the pressure below the valve has become the same as in the lifting hydraulic means, that is normally one or several lifting cylinders. Since the pump only has to increase the pressure to the existing lifting pressure the delay becomes minimal and is in the normal case so small that it is not noticed.

A particularly advantageous way to control the pumping of the motor is to control its drive torque via the motor control. Since the drive torque when the pump starts increase due to the increasing counter pressure the drive torque increase until the pressure is the same as in the lifting circuit.

Between the upstream and downstream side of the valve a non return valve is arranged allowing a flow of fluid in the direction towards the lifting means from the pump so that in the same moment that the pump pressure reaches the same value as the lifting means a flow will take place through this non return valve. This means in turn that the pressure on the delivery side of the pump will no longer rise but will instead stop at the pressure corresponding to the load carried by the lifting cylinder. The pump can thus be stopped when the torque no longer increase, that is mathematically seen it could be expressed as stopping the pump when the derivative of the torque falls to zero.

In the normal case, that is with an non-leaking pump that very quickly can compress the oil in the pump and the very short pipes to the valve that preferably is located directly on the pump, the time for setting the space below the valve under pressure will be very short, that is it will hardly be noticed as any delay at all and at the same time the jolt that otherwise would result when this oil volume was compressed is entirely eliminated.

If the pump becomes worn, the oil vary in temperature etc so that a longer time is needed to raise the pressure in the pump to the lifting pressure the device adapts automatically.

Further characteristics and advantages with the invention are apparent from the claims as well as the following description of a preferred embodiment of the invention with reference to the enclosed drawings. In the drawings FIG. 1 shows a wiring diagram of the lifting hydraulic means in a truck where the drivers cage and the driver take part in the lifting movement, FIG. 2 is diagram of the pump pressure at the initiation of a lowering movement and FIG. 3 the corresponding drive torque of the pump motor.

The shown hydraulic system includes two lifting cylinders 1 and 2 that work entirely in parallel but on each side of the truck in order to increase the stability and reduce the control requirement when for instance the loads moves laterally in relation to the truck. Each one of the lifting cylinders 1, 2 are provided with a control valve 3, 4 that are also connected to the pump 5, that in turn is connected to an oil reservoir 7. The pump is driven by an AC-motor 6 that in turn via an electronic control circuit is driven by a current from a battery.

The valves 3, 4 are in the drawing in a lifting/holding position and include each a non return valve that allow oil from the pump to be pumped to the lifting cylinders 1, 2 but do not allow a return flow of the oil. This means that when the intended lifting position has been reached as a result of pumping the pump is stopped and the non return valves prevent the return flow of oil. When one then wish to lower the lifting cylinders with associated load the pump 5 is again started and the pressure below the control valves rise in the manner shown in FIG. 2. When the pressure reaches the same level as in the lifting cylinders the pressure does not increase any more. Dependent on the inertia in the valve the pressure on the pump side of the valve will rise somewhat over the pressure of the lifting cylinder and then fall down to the pressure of the lifting cylinder when the valve opens. This gives as shown in FIG. 2 an oscillation in the pump pressure until this adjusts to the same level as the lifting pressure. The pressure equalizing is sensed and motor and pump are by the control electronics of the motor adapted to generator operation and the valves 3 and 4 are switched so that they allow free flow of oil back through the motor down to the oil reservoir. The current generated by pump and motor, (now serving as hydraulic motor and generator respectively) is delivered back to the battery, When one wish to discontinue the lowering movement this is stopped by the valves 3, 4. The system also includes limiting valves 9, 10 for the lifting cylinders and a relief valve for the pressure side of the pump.

As apparent from the diagram in FIG. 3 the drive torque of the motor follows the pressure graph and it is thus possible to use the drive torque of the motor as a measure of if the right pressure has been reached or not. Since the inertia of the valve, as mentioned above, give rise to a momentarily higher pressure and motor drive torque respectively, that then falls the pressure graph as well as the torque graph have a distinct maximum that easily can be detected by monitoring of the derivative, as soon as this falls to zero equalizing has taken place and the lowering movement can start.

Since the torque of the motor easily can be read out from the modern control electronics of electrical motors the invention will be very simple to implement. Since the drive torque is measured anyhow in the normal motor control circuit no additional measuring and no additional components are required, which however are required at a comparing of the pressures.

In the above described embodiment a valve is arranged for each lifting cylinder, alternatively one and the same valve may be connected to several lifting cylinders.

What is claimed is:

1. Method for controlling the lowering movement of lifting cylinder or cylinders of a truck, characterized in that when a lowering is to take place a pump is started in the direction that increase the pressure between the pump and a load holding valve until essentially the same pressure has been achieved as in the lifting cylinder, whereafter the pump motor is switched over from motor operation to generator operation, and the holding valve is opened so that the oil while driving the pump can flow back through this and generate an electric current.

2. Method according to claim 1, characterized in that a non return valve is arranged between pump and lifting cylinder, in the load holding valve and directed so that oil can be fed from the motor to the lifting cylinder, at which the pump pressure is monitored and the pumping disrupted when the pump pressure is no longer rising due to oil flowing through the non return valve towards the lifting cylinder.

3. Method according to claim 2, characterized in that as a measure of the pump pressure the drive torque of the motor is measured.

4. Method according to claim 1, characterized in that the pump is stopped and the valve opened for lowering when the derivative of the pump pressure or drive torque of the pump motor falls to zero, which happens immediately when the non-return valve has opened, since the pressure due to the inertia of the valve initially has time to rise somewhat over that in the lifting cylinder then to fall to the lifting pressure.

* * * * *